United States Patent Office 3,776,953
Patented Dec. 4, 1973

3,776,953
PROCESS FOR SIMULTANEOUS PRODUCTION OF HALOMETHYLPHOSPHONIC DIHALIDES, BIS-(HALOMETHYL)-PHOSPHINIC HALIDES AND METHYLHALOMETHYLPHOSPHINIC HALIDES
Ludwig Maier, Kilchberg, Switzerland, assignor to Monsanto Company, St. Louis, Mo.
No Drawing. Filed Dec. 6, 1971, Ser. No. 205,343
Claims priority, application Switzerland, Dec. 16, 1970, 18,684/70
Int. Cl. C07f 9/42
U.S. Cl. 260—543 P     6 Claims

ABSTRACT OF THE DISCLOSURE

Halomethylphosphonic dihalides, bis-(halomethyl)-phosphinic halides and methylhalomethylphosphinic halides are simultaneously produced by reacting phosphorus (white), alkali metal hydroxide, water and formaldehyde in the presence of a water-miscible monohydric alcohol to form a reaction mixture comprising alkali metal salt of methyl-hydroxymethyl phosphinic acid, alkali metal salt of bis(hydroxymethyl)phosphinic acid and the dialkali metal salt of hydroxymethyl phosphonic acid, removing volatile constituents from the reaction mixture and treating the acid salt reaction products with a halogenating agent (e.g. $SOCl_2$) thereby to convert said products to the corresponding halide derivative. The halides produced by the process are useful as flame retardants.

BACKGROUND OF THE INVENTION

Field of the invention

This invention relates to a process for simultaneous production of halomethylphosphonic dihalides having the formula $$XCH_2P(O)X_2$$

bis-(halomethyl)-phosphinic halides having the formula $$(XCH_2)_2P(O)X$$

and methylhalomethylphosphinic halides having the formula $$CH_3(XCH_2)P(O)X$$

wherein X is a halogen atom (e.g. chlorine or bromine).

In a particular aspect this invention relates to a process for the simultaneous production of said phosphorus containing halides from phosphorus (white), an alkali metal hydroxide, water and formaldehyde followed by halogenation.

Description of the prior art

Chloromethylphosphonic dichloride has been prepared by reacting $PCl_3$ and formaldehyde at 190° C. Methylchloromethylphosphinic chloride has been prepared by reacting methyldichlorophosphine and formaldehyde at 80° C. Bis-(chloromethyl)-phosphinic chloride has been prepared by heating $H_3PO_2$ and formaldehyde at elevated pressure followed by chlorination of the resulting bis-(hydroxymethyl)-phosphinic acid with a halogenating agent.

It has also been known to react white phosphorus with about stoichiometric amounts of alkali hydroxide, especially sodium hydroxide and potassium hydroxide, and with water and aldehydes in the presence of alcohols at from about 30 to about 70° C., preferably at from 45 to 65° C., and to further react the formed alkali salt of the bis-(hydroxyalkane)-phosphinic acid, being allegedly the main product, with epoxy compounds, whereby polyethers containing alcohol hydroxyl groups and phosphorus result as end products (German Pat. 1,232,578, issued Jan. 19, 1967 and German Pat. 1,249,274, issued Sept. 7, 1967).

SUMMARY OF THE INVENTION

It has been discovered in accordance with the present invention that halomethylphosphonic dihalides, bis-(halomethyl)-phosphinic halides and methylhalomethylphosphinic halides are obtained by first reacting phosphorus (white) with at least a stoichiometric amount of an alkali hydroxide and with water and formaldehyde in the presence of a monohydric alcohol thereby to form a reaction mixture comprising (1) alkali metal salt of methyl-hydroxylmethyl phosphinic acid

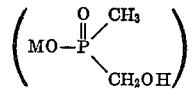

(2) alkali metal salt of bis-(hydroxymethyl)-phosphinic acid

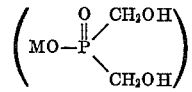

and (3) dialkali metal salt of hydroxymethyl phosphonic acid

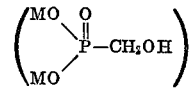

(M signifies an alkali metal atom, e.g. Na or K) and then converting the alkali metal salts to the corresponding halide derivatives by treatment with a halogenating agent.

DETAILED DESCRIPTION

The reaction of alkali metal hydroxide, water, formaldehyde and phosphorus (white) is carried out at a temperature of about 30 to about 75° C. and preferably at from about 45 to about 65° C.

The amount of alkali metal hydroxide (sodium hydroxide or potassium hydroxide) should be at least a stoichiometric amount with excess amounts (even substantial excess) being permissible.

The reaction is carried out in the presence of a monohydric alcohol, such as methanol or ethanol, which is miscible in water.

After formating of the alkali metal salts of reaction and before conversion of the salts to the corresponding halides it is preferred to remove any precipitate which may have formed from the reaction mixture as for example by filtration. It is also especially preferred before halogenation to remove volatile constituents from the reaction mixture as for example by evaporation.

The halogenation step of the process of present invention is carried out in the known manner using any suitable halogenating agent. Suitable halogenating agents useful in the process of the present invention include $SOCl_2$, $SOBr_2$, $PCl_3$, $PBr_3$, $PCl_5$, $PBr_5$, $POCl_3$, $POBr_3$, etc. and the like. After halogenation, the resulting halides can be individually separated from the reaction mixture by fractional distillation. The alkali metal salts resulting from the reaction of white phosphorus, water, alkali metal hydroxide and formaldehyde in the presence of water-miscible monohydric alcohol are not separated by fractional distillation.

The process of the present invention thus permits the simultaneous preparation of halomethylphosphonic dihalides, bis-(halomethyl)-phosphinic halides and methylhalomethylphosphinic halides by a simple, direct synthesis using elemental white phosphorus which halides can be readily separated by simple fractional distillation procedures.

The compounds of invention are useful as flame retardants for combustible materials. They also are recognized intermediates for the syntheses of insecticides, herbicides and fungicides as well as of numerous other valuable compounds, since the halogen atom or atoms can be exchanged for a variety of organic groups. The corresponding acids, namely methylhalomethylphosphinic acid, bis-(halomethyl)-phosphinic acid and halomethylphosphonic acid, are obtainable by hydrolysis of the acid halides with water in usual manner. These acids also possess well-known utilities, in particular in the flame proofing of cotton.

The following example is presented for the purpose of illustration only.

EXAMPLE

To a mixture of 15.5 grams (0.5 mol) of white phosphorus, 140 milliliters of methyl alcohol and 37.5 grams (1.0 mol) of formaldehyde, are slowly added at 55° C. within 1 hour a solution of 15.7 grams (0.78 mol) of sodium hydroxide in 7 grams of water and 135 grams of methyl alcohol.

After heating at 55° C. for 4 hours, a small amount of white solid compound (precipitate) is filtered off (2.4 grams). The filtrate yields upon evaporation 81.1 grams of a yellow tough viscous mass which does not crystallize and, according to the $^1$H-NMR spectrum, consists of the following compounds.

$CH_3(HOCH_2)P(O)NOa$: $CH_3$ at 1.77 and 2.98 p.p.m. (two $d$, $J_{PCH}$ 13 c.p.s., 3H), $OCH_2$ at 4.55 p.p.m. ($J_{PCH}$ 3.5 c.p.s., 2H), HO at 5.3 p.p.m. (s.), $^{31}$P —51.3 p.p.m.;

$(HOCH_2)_2P(O)ONa$: $OCH_2$ at 4.65 p.p.m., $^{31}$P —39.3 p.p.m.;

$HOCH_2P(O)(ONa)_2$: $OCH_2$ at 4.60 p.p.m. ($J_{PCH}$ 3 c.p.s.), $^{31}$P —21.6 p.p.m.;

$(HOCH_2)_3PO$ (very small amount): $OCH_2$ at 4.61 p.p.m. ($J_{PCH}$ 3 c.p.s.), $^{31}$P —48.5 p.p.m.

To 200 milliliters of $SOCl_2$ are slowly added at 70° C. within 1 hour— 65 grams of the above mixture. After a further hour at 70° C., there are obtained by distillation 82.3 grams of a mixture of products; B.P. 60–80° C./0.4 torr, which, according to the $^1$H-NMR spectrum, consists of the following compounds.

$CH_3(ClCH_2)P(O)Cl$ (32.5 mol percent): $CH_3$ at 2.11 p.p.m. ($J_{PCH}$ 14 c.p.s.), $ClCH_2$ at 3.87 p.p.m. ($J_{PCH}$ 7.5 c.p.s.), $^{31}$P —58.1 p.p.m.;

$(ClCH_2)_2P(O)Cl$ 30.2 mol percent): $ClCH_2$ at 4.05 p.p.m. ($J_{PCH}$ 7.2 c.p.s.), $^{31}$P —51.4 p.p.m.;

$ClCH_2P(O)Cl_2$ (37.2 mol percent): $ClCH_2$ at 4.16 p.p.m. ($J_{PCH}$ 6.0 c.p.s.), $^{31}$P —39.8 p.p.m.

The fractional distillation of the acid chlorides (82.3 g.) yields 29.3 g. of $ClCH_2P(O)Cl_2$, B.P. 86–89° C./10 torr, $n_D^{20}$ 1.4972; 30.6 g. of $(ClCH_2)_2P(O)Cl$, B.P. 92–98° C./1 torr, $n_D^{20}$ 1.5200; and 22.4 g. of

$CH_3(ClCH_2)P(O)Cl$

B.P. 70° C./0.8 torr.

Hydrolysis of the mixture (5 grams) in water and evaporation in vacuo yields 4.3 grams of the acid mixture, which, according to the $^1$H-NMR spectrum, consists of:

$CH_3(ClCH_2)P(O)OH$ ($^{31}$P —47.8 p.p.m.);
$(ClCH_2)_2P(O)OH$ ($^{31}$P —36.8 p.p.m.); and
$ClCH_2P(O)(OH)_2$ ($^{31}$P —18.2 p.p.m.) in a molar ratio of 32.5:30.2:37.2 mol percent.

I claim:
1. A process for the simultaneous production of halomethylphosphonic dihalide, bis-(halomethyl)-phosphinic halide and methylhalomethylphosphinic halide which comprises reacting white phosphorus with at least a stoichiometric amount of an alkali metal hydroxide and with water and formaldehyde in the presence of a water-miscible monohydric alcohol at a temperature in the range of from about 30 to about 75° C. to form a reaction mixture comprising alkali metal salt of methyl-hydroxymethylphosphinic acid, alkali metal salt of bis(hydroxymethyl)phosphinic acid, and dialkali metal salt of hydroxymethylphosphonic acid and treating said reaction mixture with a halogenating agent to convert said acid salts to the corresponding halides.

2. The process of claim 1 wherein the alkali metal hydroxide is sodium hydroxide.

3. The process of claim 1 wherein the monohydric alcohol is methanol.

4. The process of claim 1 wherein the halogenating agent is $SOCl_2$.

5. The process of claim 1 wherein the temperature is in the range of from about 45 to about 65° C.

6. A process for the simultaneous production of halomethylphosphonic dihalide, bis-(halomethyl)-phosphinic halide and methylhalomethylphosphinic halide which comprises reacting white phosphorus with at least a stoichiometric amount of an alkali metal hydroxide and with water and formaldehyde in the presence of a water-miscible monohydric alcohol at a temperature in the range of from about 30 to about 70° C. to form a reaction mixture comprising alkali metal salt of methyl-hydroxymethylphoshpinic acid, alkali metal salt of bis(hydroxymethyl)phosphinic acid and dialkali metal salt of hydroxymethylphosphonic acid, removing volatile components from said reaction mixture and treating said reaction mixture with a halogenating agent to convert said acid salts to the corresponding halides.

References Cited

UNITED STATES PATENTS

| | | | |
|---|---|---|---|
| 2,929,843 | 3/1960 | Dawson et al. | 260—543 P |
| 3,143,569 | 8/1964 | Abramo et al. | 260—543 P |
| 3,200,145 | 8/1965 | Lutz et al. | 260—543 P |
| 3,492,374 | 1/1970 | Bleu et al. | 260—543 P X |

FOREIGN PATENTS

| | | |
|---|---|---|
| 1,232,578 | 1/1967 | West Germany. |
| 1,249,274 | 9/1967 | West Germany. |
| 130,512 | 2/1960 | U.S.S.R. 260—543 P |

LORRAINE A. WEINBERGER, Primary Examiner

R. D. KELLY, Assistant Examiner

U.S. Cl. X.R.

260—502.4 R